United States Patent
Cumbie et al.

(10) Patent No.: US 11,912,024 B2
(45) Date of Patent: Feb. 27, 2024

(54) TEMPERATURE DETECTION AND CONTROL

(71) Applicant: Hewlett-Packard Development Company, L.P., Spring, TX (US)

(72) Inventors: Michael W. Cumbie, Albany, OR (US); James Michael Gardner, Corvallis, OR (US); Scott A. Linn, Corvallis, OR (US); George H. Corrigan, III, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/951,929

(22) Filed: Sep. 23, 2022

(65) Prior Publication Data
US 2023/0018474 A1    Jan. 19, 2023

Related U.S. Application Data

(63) Continuation of application No. 16/956,353, filed as application No. PCT/US2019/016811 on Feb. 6, 2019, now Pat. No. 11,479,036.

(51) Int. Cl.
*B41J 2/045* (2006.01)
*G01K 13/02* (2021.01)
*B41J 2/14* (2006.01)

(52) U.S. Cl.
CPC ....... *B41J 2/04563* (2013.01); *B41J 2/04546* (2013.01); *G01K 13/026* (2021.01); *B41J 2002/14491* (2013.01); *B41J 2202/13* (2013.01)

(58) Field of Classification Search
CPC .......... B41J 2/0458; B41J 2/04563; B41J 2002/14491; B41J 2202/13; B41J 2/04581; B41J 2/04541; B41J 2/1753; B41J 2/17546; B41J 2/17553; B41J 2/04546; G01K 13/026
See application file for complete search history.

(56) References Cited

U.S. PATENT DOCUMENTS

| | | | |
|---|---|---|---|
| 5,635,968 | A | 6/1997 | Bhaskar et al. |
| 5,745,130 | A | 4/1998 | Becerra et al. |
| 6,278,468 | B1 | 8/2001 | Watrobski et al. |
| 6,641,243 | B2 | 11/2003 | Anderson et al. |
| 8,308,274 | B2 | 11/2012 | Sheahan et al. |
| 9,108,448 | B1 | 8/2015 | Bergstedt |
| 9,669,624 | B2 | 6/2017 | Maxfield |
| 2004/0239712 | A1 | 12/2004 | Liao et al. |
| 2006/0274103 | A1 | 12/2006 | Kim |

(Continued)

FOREIGN PATENT DOCUMENTS

| | | |
|---|---|---|
| CN | 107073957 A | 8/2017 |
| JP | 08-150713 A | 6/1996 |

(Continued)

*Primary Examiner* — Jannelle M Lebron
(74) *Attorney, Agent, or Firm* — Foley & Lardner LLP

(57) ABSTRACT

A print component integrated circuitry package includes a number of temperature sensors where each of the plurality of the temperature sensors is disposed in a corresponding temperature region of an integrated circuitry. In an example, an analog sense bus conductively connects to all of the plurality of temperature sensors and an external sensor pad that is to connect to a corresponding print controller contact.

17 Claims, 6 Drawing Sheets

(56) References Cited

U.S. PATENT DOCUMENTS

| | | |
|---|---|---|
| 2006/0290734 A1 | 12/2006 | Habuka |
| 2008/0084439 A1 | 4/2008 | Sheahan et al. |
| 2011/0310210 A1 | 12/2011 | Furukawa et al. |
| 2017/0232734 A1* | 8/2017 | Anderson ............ B41J 2/04563 347/13 |
| 2018/0162123 A1 | 6/2018 | Nomura |

FOREIGN PATENT DOCUMENTS

| | | |
|---|---|---|
| WO | 2016/068900 A1 | 5/2016 |
| WO | 2017/019065 A1 | 2/2017 |

* cited by examiner

200

600

TEMPERATURE DETECTION AND CONTROL

CROSS REFERENCE TO RELATED APPLICATIONS

This is a continuation of U.S. application Ser. No. 16/956,353 filed Jun. 19, 2020 which is a national stage entry of international application no. PCT/US19/16811 filed Feb. 6, 2019, each incorporated herein in its entirety.

BACKGROUND

Printers and printer cartridges can use a number of technologies to convey ink or other fluids to a medium. The fluid may be applied to a medium using a device affected by temperature differences across the device. Print quality can be determined in part by the outcome of a print job matching the input the printer is instructed to print. Print components of this disclosure may include applications for 2D and 3D printing, as well as other high precision fluid dispensing devices for laboratory, medical, pharmaceutical, life sciences and other appliances; any fluids or agents used in these applications; and integrated circuits to expel or propel these fluids, amongst others.

DESCRIPTION OF THE DRAWINGS

Certain examples are described in the following detailed description and in reference to the drawings, in which.

DETAILED DESCRIPTION

Figure 1:
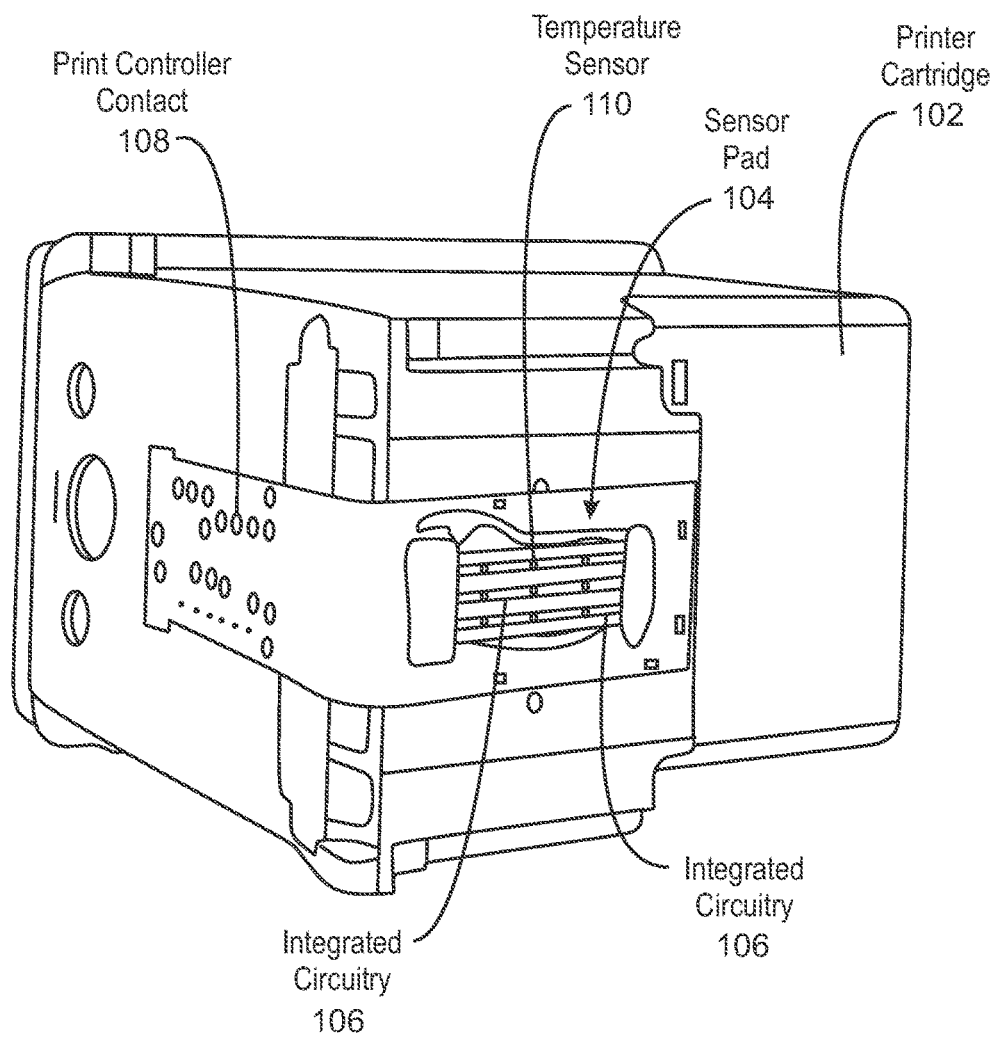
FIG. 1 is a block diagram of an example print component integrated circuitry package for thermal sensing and control.

Printing devices can generate heat during operation. Thermal print components may operate through the heating of ink or other fluid to push ink out of a nozzle and onto a page, using heater resistors adjacent these nozzles. The heat generated can be transferred to the printing device itself causing temperature on the die to vary. The temperature of the printing device can affect the way the printing device operates. For example, the temperature of a print head die, or, more generally, the temperature of the integrated circuitry to actuate and deliver the fluid, can affect the size, speed, shape, and volume of fluid delivered by the printing device over a set period of time.

The heat generated through the printing process can be unevenly distributed along the printing device. For example, nozzles in the integrated circuitry of a printing device may be warmed or heated by heated fluid passing through. The temperature of the integrated circuitry may vary based on a number of factors including die size, the number of nozzles in an area, the distance between nozzles, the distance between nozzles and the edges of the integrated circuitry, the shape and dimensions of the integrated circuitry and assembly, and the printing pattern in use, among others.

Thermal ink jet printing can be sensitive to operating temperature. One degree of variation can lead to ~1% difference in ink drop weight, and the human eye can perceive differences on the order of 2-3%. For low end printing applications, a single print pen is scanned multiple times across a page to form the full printed image. At the intersection of one swath and the next print swath, an imaginary boundary is formed where the dots above the boundary are printed by nozzles on the bottom end of the print pen and the dots below the boundary are printed by nozzles on the top end of the print pen. If temperature control varies greatly across the print pen nozzle swath, a human perceivable line or "band" is formed leading to poor print quality. This is due to the variation in ejected drop size corresponding to the temperature differences between the two ends of the printing die and more specifically at least two different nozzles on different ends of the die having a variation in temperature. For this reason, managing temperature in multiple temperature zones is key to enabling print quality. To address this the present techniques regard a shared "sense" bus that may enable multiple print die for multiple colors, for example, K, C, M, Y, and multiple diodes per die associated with temperature zones to be multiplexed and measured externally through this shared analog bus.

When the printing device uses thin or narrow silicon die, there is less silicon to conduct heat and thereby maintain a constant temperature along the die. The long end zones of thinner narrower die act as large areas to cool die ends. These two characteristics make a thin or narrow die more susceptible to temperature variation than a thick or wide die. In order to overcome this, the present techniques relate to a multi-zone thermal control system.

Driver circuits for managing temperature differences between multiple zones may be located on or off die. The desire to achieve the use of low cost drivers, can involve relocating complex analog control circuitry off die during production. This move in the location of the analog control circuitry can increase the interconnect challenge for a system attempting to address multiple sensors, however it is contemplated in the scope of these techniques. Another technique includes using a global analog sensor bus that is common between die connecting through a sensor pad per die that enables multiplexing on die and between die. Through this multiplexing, the multiple temperature zones may be coordinated off-die thereby enabling more complex algorithms to improve thermal uniformity on die. Improved thermal uniformity helps eliminate print artifacts during printing.

In an example, there may be three thermal zones per die. In an example, there may be more than three zones or less than three zones per die. In each of these zones, there may be an independent temperature sensor. For each die, there may also be one or more heating elements. There may be more heating elements. There may be pulse warming on the silicon die. The temperature sensors and heating elements may be controlled by external application-specific integrated circuit (ASIC) through a multiplexed sense bus. The thermal zones may be monitored over time. The thermal zones may also be monitored at a specific frequency, e.g. the frequency of printing divided by the number of temperature sensors connected to the sense bus.

The protocol for checking temperature and adjusting heat using the shared sense bus for all sensors follows a sense protocol. In an example, the sense protocol can be multiplexed in-situ while printing using the thermal ink jet printing protocol. In an example, this means the maximum sense rate is a function of the print frequency, the number of sensors on the bus, and the sequence in which these sensors are cycled.

Use of heating elements in the die end zones can reduce the temperature differential in the nozzle array and thereby improve print quality. In an example, the temperature differential across the nozzle array can be reduced from 10 C to 2-3 C. The reduction in temperature differential reduces the banding seen when the ends of a die differ in temperature from the middle portions of a die.

When a thermal ink jet nozzle is printing a drop of fluid, heat is dissipated at the location of that nozzle. Some of that heat is conducted into the die, causing an increase in temperature. In an example, a die of smaller mass can be more susceptible to rapid temperature fluctuations during print density transitions. In the end zones there are no nozzles directly applying heat, so that the greatest source of heat that raises the temperature of the end zones is that which is conducted through the die from the printing zone. In an example of a thin or narrow die, conduction of heat to the end zones is constrained by the small cross section. This constraint, in combination with the absence of nozzles in the end zones, and end zones that are large for holding multiplexing or other components, can put the die at higher risk for poor thermal uniformity center to end. Heat is conducted out of a print head through heat transfer when ink flows through the feed slot and nozzles. Additionally, heat transfer may occur through thermal conductivity of materials such as silicon. Furthermore, the compound, such as epoxy, used to embed the silicon slivers also conducts heat, and is a contributing factor in the heat loss increasing the resulting thermal gradients on die. These modes of heat transfer are aspects of the print die can contribute to heat loss, and if not accounted for, degraded print quality and banding. The temperature differential across the area of the die is increased due to the warming effects from field effect transistors and resistor heating occurring near the center of the print die. By adding warming elements to areas most affected by heat loss, a large temperature differential across the die can be reduced. The areas often needing warming are often the die ends as these ends are further away from a higher density of field effect transistors and other resistor heating occurring in the middle of the die. Further, the smaller the die is in mass, the more susceptible the die will be to rapid temperature fluctuations during print density transitions. The techniques shown use die with relatively smaller mass to previous print die. These thinner die increase the thermal resistance to maintaining and achieving equilibrium between the center and end of die. Further, the thinner print die often have elongated end zones in order to preserve total circuit area in order to accommodate the same circuitry plus any additional multiplexing circuitry or other components. These elongated end zones can hold down end zone temperature because they have no heat input from fluidic actuators. As noted above, the location of the fluidic actuators corresponds to the locations of the nozzles. End zones, and more so elongated end zones, do not include these heat generating devices. As such, these areas and the ink nozzles closest to these end zones have a lower temperature when compared to a zone in the middle of the print die.

The placement of heating elements and sensors can affect the efficacy of end warming. For example, the improper placement of sensors and heaters relative to nozzles will result in poor thermal uniformity across the nozzle swath. For example, if the sensor were on the opposite side of the end-most nozzle from a heating element on the end of a die, the heater would continue heating past the point of thermal uniformity because the temperature adjustment would reach the sensor after it had reached nozzle. Similarly, if the sensor is closer to the heating element than the nearest nozzle, then the heating sensor may detect an equilibrium temperature prior to the target temperature being reached by the nearest nozzle that is in the area targeted for heating.

FIG. 1 is a drawing of an example replaceable print head cartridge 100. The drawing includes and excludes components in order to provide context to show the techniques.

The print component integrated circuitry package 100 may be housed or disposed on a printer cartridge casing 102 or other removable or refillable printing mechanism. The printer cartridge includes a sensor pad 104 to detect signals from an integrated circuitry 106. As described herein the sensor pad 104 enables using a common analog bus to interconnect multicolor silicon dies mounted in a polymeric mounting compound, such as an epoxy potting compound. In an example, the integrated circuitry is a silicon print die. In an example, the integrated circuitry 106 can be a body of silicon including an array of print nozzles. The printer cartridge casing 102 can include a number of discrete units of integrated circuitry where each corresponds to a different color. Alternatively, a printer cartridge casing 102 may have a single fluid deploying unit for integrated circuitry 106. The integrated circuitry 106 can be conductive for electrical signals.

Signals going to or from the integrated circuitry 106 may be transmitted from the sensor pad 104 to a print control contact 108 which may communicate electronically with a component in physical contact with the print control contact 108. The signals transmitted can originate from sensors on the integrated circuitry 106. In an example, the sensors on the integrated circuitry are temperature sensors 110 that detect the temperature of a region on the integrated circuitry 106. Each discrete integrated circuitry component can have a single temperature sensor 110 or a number of temperature sensors 110. The temperature sensors 110 may be disposed across the integrated circuitry 106 in order to observe the temperature across different physical regions of the integrated circuitry 106. The different physical regions of the integrated circuitry 106 can correspond to temperature regions. Temperature regions are regions through which heat may travel differently or the temperature of the region may be affected differently from other regions due to the dimensions, characteristics, and components in the region. The temperature region of the temperature sensor 110 can be an end region or the middle region of the integrated circuitry 106. The end region may be a region defined such that the end region is closer to an edge of the integrated circuitry 106 than to a middle region of the integrated circuitry 106. In an example, the end region may be a continuous space taking up one tenth of the length of the integrated circuitry 106. The middle region may be located in the middle of the integrated circuitry 106. The middle region may extend to include a symmetrical or asymmetrical surrounding area around the middle of the integrated circuitry 106. The middle region may be one tenth the length of the longest edge of the integrated circuitry 106. The middle region may be the same size as the edge region.

There may be a number of temperature sensors 110 and a first temperature sensor can be located in a first region of integrated circuitry 106 and a second temperature sensor 110 can be located on a second region of the integrated circuitry 106. These regions may be on the same integrated circuitry 106 or separate and distinct integrated circuitry 106. The first region of integrated circuitry 106 can provide a first color such as black, red, yellow, or blue and the second region of integrated circuitry provides a second color, such as cyan, magenta, yellow, and black. The first region of integrated circuitry for which temperature is sensed may be located in a first print pen holding the printer cartridge casing 102 and the second region of integrated circuitry 106 may be located in a second print pen holding another cartridge. The connection of multiple temperatures sensors 110 across multiple integrated circuitry 106 that may or may not be in the same print pen or for the same color increases the importance of the sensor pad 104 to multiplex signals appropriately to and from print controller contact 108.

In an example, an analog sense bus can be conductively connected to the number of temperature sensors 110 and the sensor pad 104. In an example, the sensor pad 104 is an external sensor pad that is external in that the sensor pad 104 is located on an external face of the printer cartridge casing 102. The sensor pad 104 may connect to a corresponding print controller contact 108. The sensor pad may also multiplex signals traveling to the number of temperature sensors 110 from the print controller contact 108. The temperature sensors 110 may be connected to a single sensor pad 104. The sensor pad 104 can transfer signals from the temperature sensors 110 to a corresponding print controller contact 108. In an example, the temperature sensors 110 return a signal to the external sensor pad 104 in response to an instruction for the integrated circuitry 106 to print. In this example, the signal request for the integrated circuitry 106 to print also includes instructions for the temperature sensors 110 to detect the temperature in the region they are located and report the detected temperature to the sensor pad 104. In order to accomplish a single signal arriving at the external sensor pad 104 at a time, the signals are multiplexed from each of their respective sources based on information delivered in a data packet to the components on the integrated circuitry 106. For example, selection bits can be included in a data packet, such as a fire pulse group. Selection bits may indicate, to components on the integrated circuitry, which thermal sensor to select. A selected thermal sensor may also be given instructions regarding the steering and timing of its signal to arrive at the external sensor pad 104. The use of selection bits coordinated to the fire pulse group allows multiplexing on the die among the components of the die. These selection bits may enable the signal from each thermal sensor to be steered at an appropriate time towards the external sensor pad so that the outgoing signal from the sensor pad 104 may be a single stream of output rather than a stream for each temperature sensor 110.

In an example, the frequency at which signals are returned to the sensor pad 104 to be sent to the print controller contact 108 is at the rate of the integrated circuit print rate divided by the number of the temperature sensors 110. Using an integrated circuit print rate divided by the number of temperature sensors 110 can be tied to read off frequency of each sensor because the print data may specify a single temperature sensor 110 to be read for each print command. A single temperature sensor 110 can be identified, e.g. through a selection bit included in the data, in a print command to the integrated circuitry 106. The integrated circuitry 106 selects the appropriate temperature sensor or sensors to be multiplexed onto the external pad, where the temperature sensors communicate a voltage representative of temperature. The voltage measurement of the temperature sensor can be calibrated to correspond to a different temperature reading based on calibrations done locally or remotely and programed into the integrated circuitry 106. The temperature sensor 110 selected rotates among the number of temperature sensors 110 on the printer cartridge casing 102. In one example, the number of temperature sensors 110 provide a signal one after the other along the shared analog sense bus to the external sensor pad 104 without repeating until each of the temperatures sensors 110 has provided the signal carrying the detected temperature. In an example, the specifically selected temperature sensor is controlled by the changing of a bit value in a control register disposed on the integrated circuitry 106. The control register may be located in a memory circuit of the integrated circuitry 106 that can be located either on or off the integrated circuitry.

Figure 2:
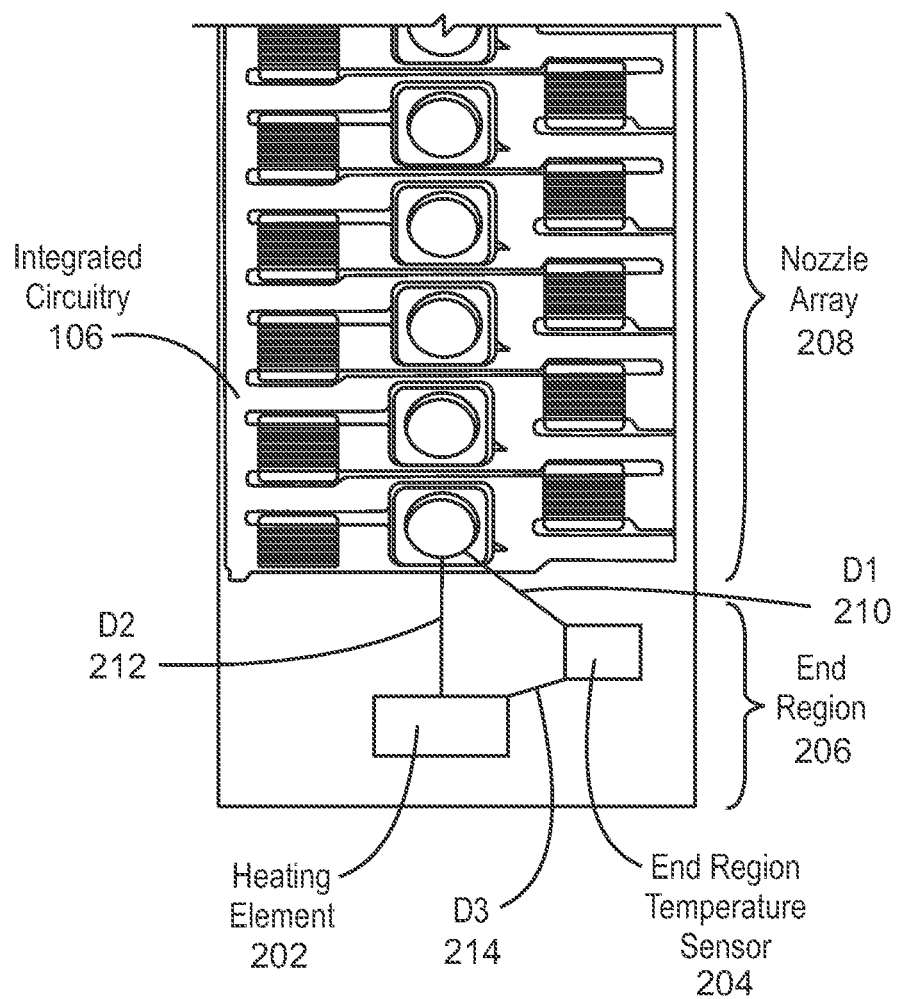
FIG. 2 is a block diagram of an integrated circuitry layout.

FIG. 2 is a block diagram of an integrated circuitry layout 200. Like numbered items are as described with respect to FIG. 1.

The integrated circuitry layout 200 can include memory circuitry that stores data received in a signal from a single analog bus. The integrated circuitry layout 200 can be part of a replaceable print head cartridge that includes a single contact pad located on the exterior of the replaceable print head cartridge. The integrated circuitry layout can host components responsive to signals from the single contact pad that is to communicate stored data from the single lane analog-bus to a number of temperature sensors on the integrated circuitry 106. The integrated circuitry 106 can include a heating element 202 that can provide heat to the integrated circuitry attached to the heating element 202. An end region temperature sensor 204 may be located on the end region 206 along with the heating element 202. There may be a nozzle array 208 that includes a number of nozzles in the nozzle array 208 that align in a nozzle line. The area on the integrated circuitry past the last nozzle on the end of the nozzle line may indicate the beginning of the end region 206. The end region 206 in some examples may include portions of the integrated circuitry in the area surrounding a number of nozzles closest to the end region.

The end region 206 can include a heat element 202 mounted on the face of the integrated circuitry intended to be directed towards the print medium on which ink is delivered. In another example, the heat element 202 can be mounted on the face of the integrated circuitry 106 closest to the print cartridge relative to the medium which will be printed on. The end region temperature sensor 204 may be able to detect the temperature over a period of time to determine the effects of the heating element on the temperature of the integrated circuitry in and near the end region 206.

The single contact pad of the integrated circuitry layout 200 can be conductively coupled to a number of temperature sensors in order to multiplex data going to and coming from the number of temperature sensors. The number of temperature sensors includes the end region temperature sensor 204, where each temperature sensor is disposed in a number of temperature regions including the end region 206 on an integrated circuitry 106. The temperature sensors can return a signal to the single contact pad in response to an instruction for the integrated circuit to print. The print signal may include an indication of a specific temperature sensor which should detect the temperature and return the voltage representative of the detected temperature in response to a print command sent to the nozzles. In an example, the single contact pad of the integrated circuitry can multiplex signals at a frequency of an integrated circuit print rate divided by the number of temperature sensors. Temperature sensing bandwidth and operation can take into account the physical time it takes for a temperature change to propagate along the length of silicon from heat source to sensor. This allows consideration of the optimal position and placement of heaters and sensors relative to the nozzle locations.

In order to ensure that the temperature sensor is representative of the nozzle temperature, in an example, D3 roughly equals D1 which roughly equals D2, where D1 210 is the distance between the end region temperature sensor 204 and the nearest nozzle, D2 212 is the distance between the nearest nozzle and the heating element 202, and D3 214 is the distance between the temperature sensor 204 and the heating element 202. In an example, the arrangement is to ensure D2 212 is greater than ~100 um. In an example, D3 214 is less than or equal to ~500 um.

Figure 3:
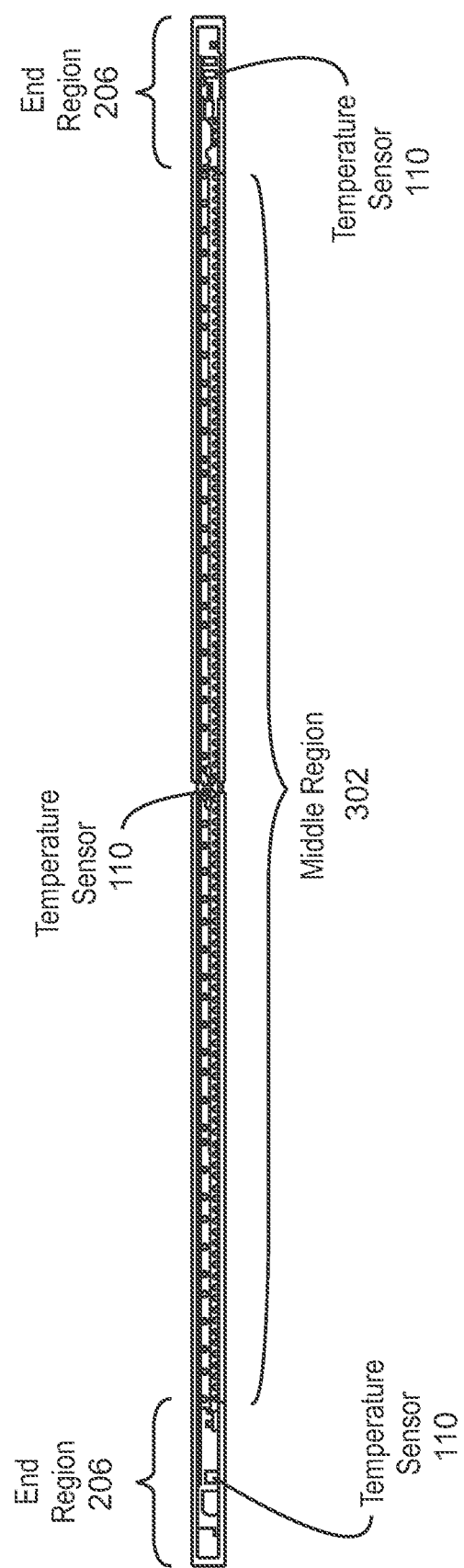
FIG. 3 is a block diagram of an example of an integrated circuitry front view.

FIG. 3 is a block diagram of an example of an integrated circuitry front view 300. Like numbered items are as discussed above regarding FIG. 1 and FIG. 2.

In the front view shown in FIG. 3, length and width are drawn, with length being assigned to the largest measured dimension of the integrated circuit, and the width being the measurement drawn that is perpendicular to the axis of the length. While a front view is shown in FIG. 3, if a side view were being shown, the length and height would be drawn, with height being along the axis typically measured thicknesses. If an end view were shown, width and height would be drawn.

The integrated circuitry front view 300 includes an approximated demarcation between an end region 206 and a middle region 302 of the integrated circuitry. As before, the integrated circuitry 106 can be a silicon print die through which ink may flow. The integrated circuitry front view 300 shows that the integrated circuitry may be longer that its width which is shown in FIG. 3 and is perpendicular to the length of the integrated circuitry. The orientation shown in FIG. 3 shows that the end regions 206 are located on the ends or distal regions of the integrated circuitry. The integrated circuit may have a length, width, and height dimension. As the end regions 206 are located on opposite distal sides of the length of the integrated circuitry, the end regions may be the regions that are furthest away from each other. In an example each end region may include the entire width and height of the integrated circuitry and only a portion of the length of the integrated circuitry. In this example, the end region 206 may be one tenth of the length of the integrated circuitry. The end region 206 may be less than one twentieth of the lengths of the integrated circuitry. The end region 206 may be less than one fifth the length and more than one twentieth of the length of the integrated circuitry.

The middle region 302 may be the region of the integrated circuitry not considered an end region 206 of the integrated circuitry. In an example, each end region and the middle region have one temperature sensor 110 each. The middle region 302 may include the height and width of the integrated circuitry and four fifths of the length of integrated circuitry. In an example, the middle region 302 may be more than nine tenths the length of the integrated circuitry.

The location of temperature sensors across the middle region 302 and each end region 206 enable the detection of temperature differences during printing. These temperature differences if unaccounted for, can alter the way fluid such as ink is delivered to the medium and affect overall print quality. To reduce the impact of temperature variation across the integrated circuit, the number of temperature sensors 110 enable measurements of temperature in various temperature regions, e.g. end region 206 and middle region 302. Using this information, heating elements may be used in the end regions to raise the temperature of the end region 206 to match the temperature detected from the middle region.

Figure 4:
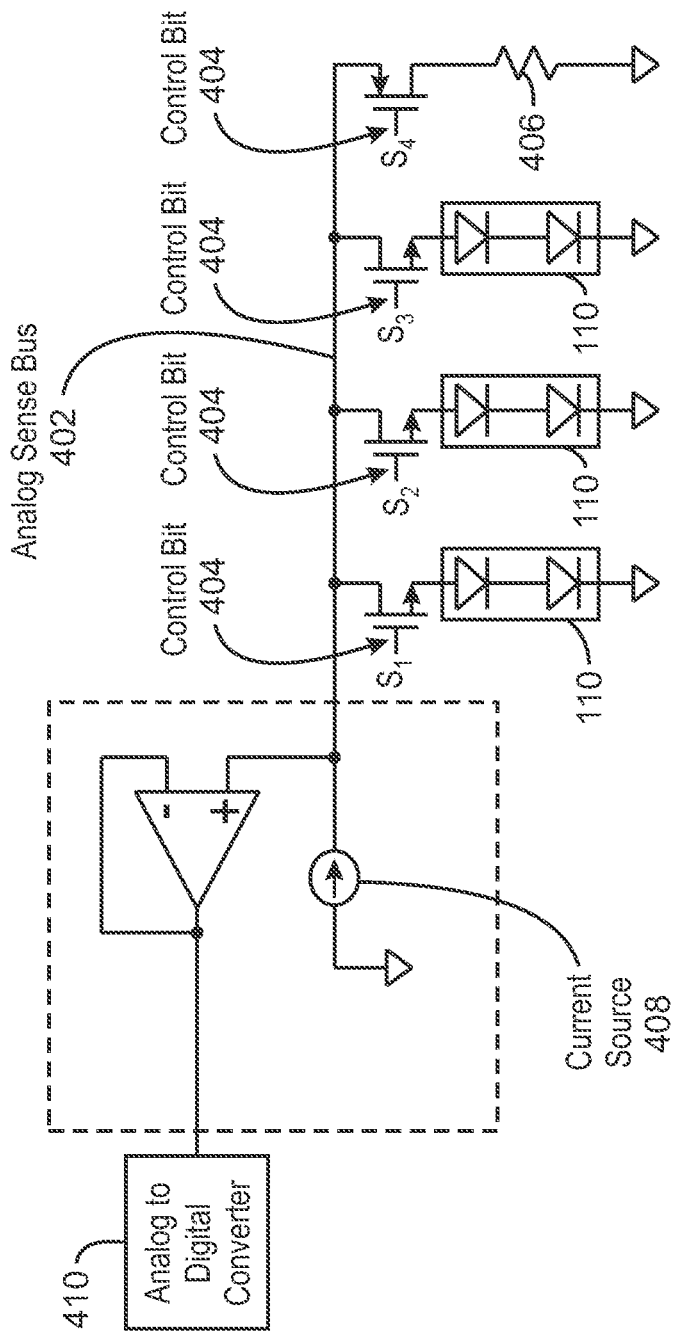
FIG. 4 is a block diagram of an example printer circuit diagram.

FIG. 4 is a block diagram of an example printer circuit diagram 400. Like numbered items are as described with regard to FIG. 1.

The printer circuit diagram 400 includes a single lane analog sense bus 402 to electrically connect each of the temperature sensors 110 together to report temperatures to the sensor pad and then print controller contact 108. Instruction may also be delivered to each of the temperature sensors 110. Each one of the temperature sensors 110 can correspond to either an end or middle region of an integrated circuitry 106. As shown in FIG. 4, one implementation of the temperature sensors 110 includes a dual diode stack set to have a sensing range with a specific output range for voltage in response to a current supplied to the temperature sensor 110.

Each temperature sensor 110 can be controlled by a corresponding control bit 404. The control bit 404 may be modified when a particular temperature sensor 110 should sense and report a temperature for its corresponding region. The control bit 404 may be checked each time there is a print signal. A control bit 404 may be used for a temperature sensor 110 or a condition circuit 406 located in the integrated circuitry 106. In an example, the condition circuit 406 may detect another physical condition other than temperature for the integrated circuitry 106. The analog sense bus 402 may be connected to a current source 408 that supplies current for each of the control bits 404, the temperature sensors 110, and the condition circuit 406. This current is analog and the responses from the temperature may also be conveyed using analog signals sent to an analog to digital converter 410. In an example, the analog to digital converter may be located on the integrated circuitry 106 or may be located off of the integrated circuitry 106.

Figure 5:
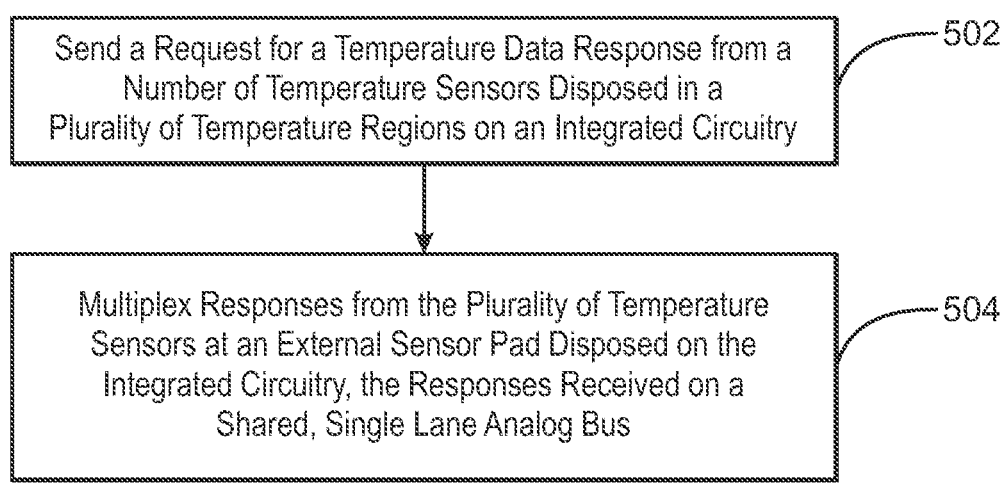
FIG. 5 is a flowchart of an example method for temperature sensing in an integrated circuitry.

FIG. 5 is a flowchart of an example method 500 for temperature sensing in an integrated circuit. While shown in a specific sequence, the method may repeat or start at a different point in the sequence.

At block 502, the method 500 includes sending a request for a temperature data response from a number of temperature sensors disposed in a number of temperature regions on an integrated circuitry. In an example, the integrated circuitry is a silicon print die. A first temperature sensor of the number of temperature sensors may be located on a first silicon print die and a second temperature sensor of the number of temperature sensors can be located on a second silicon print die.

At block 504, the method 500 includes multiplexing responses from the number of temperature sensors at an external sensor pad disposed on the integrated circuitry, the responses received on a shared, single lane analog bus.

Figure 6:
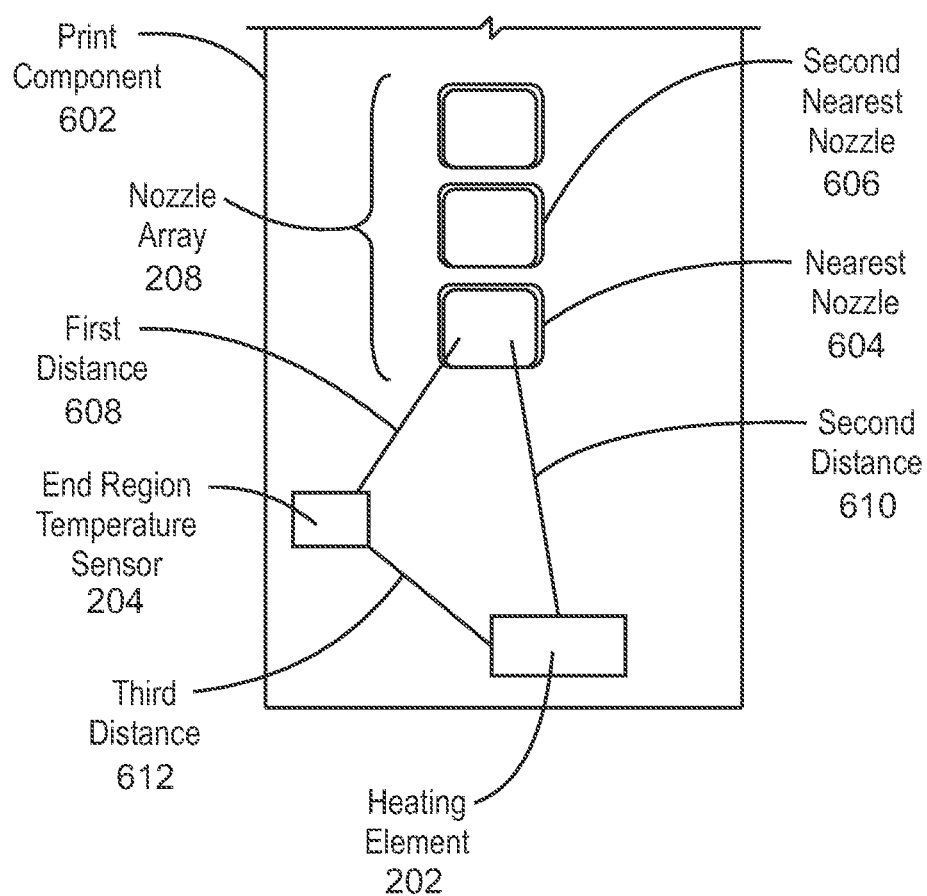
FIG. 6 is a block diagram of an example printer component layout.

FIG. 6 is a block diagram of an example printer component layout 600. Like numbered items are as discussed above with regard to FIG. 2.

The printer component layout 600 is shown for a print component 602. In an example, the print component 602 can be the integrated circuitry 106 seen in FIGS. 1 and 2. In an example, the print component 602 may be material other than circuitry to enable the placement and layout of subcomponents shown.

The print component 602 can include a nozzle array 208. The nozzle array 208 shown here is one example of a number of nozzles aligned in a nozzle array. Other configurations and numbers of nozzles are contemplated. The print component 602 includes a heating element 202 and an end region temperature sensor 204. The heating element 202 can be used to counteract any end region temperature deficiency relative to the temperature detected for a middle region of the print component 602. In an example, the heating element 202 may be controlled by a print data packet that controls which thermal sensor is selected.

In order to determine the temperature of the end region, the end region temperature sensor 204 is used. The end region temperature sensor 204 collects temperature data over time. The collection of temperature data can be used to identify when an end region temperature is deviating from the temperature of another region of the print component. The collection of temperature data can be used to identify when an end region temperature has been warmed by a heating element 202 and when the end region is warm relative to a target temperature.

The end region may begin in an area that relates to the end-most nozzles in the nozzle array 208. The nozzles in the nozzle array 208 may form a line by their position. A nozzle array 208 with nozzles not in a line may instead have nozzles grouped closer to one another than to one of the edges of the print component 602.

To provide another frame of reference for understanding the placement of these nozzles, consider the direction of travel of a print component 602 moving in sweeping motions back and forth across a print medium. In this example, as the print component 602 moves to print, the length of the print component is the dimension running roughly perpendicular to the direction of travel of the print component and roughly parallel to the print medium. On either ends of this length of the print components are the end regions which can include the nearest nozzle 604. The nearest nozzle 604 uses the end region temperature sensor 204 and the heating element 202 as items to which the nozzles are most nearly located. The nearest nozzle 604 may also be nearer to the edge of the lengthwise dimension than other nozzles on the print component 602.

The distance between the nearest nozzle 604 and the end region temperature sensor 204 is considered the first distance 608. The distance between the nearest nozzle 604 and the heating element 202 is the second distance 610. The distance between the heating element 202 and the end region temperature sensor 204 is the third distance 612.

A print component can include a nozzle array, a temperature sensor disposed on the print component a first distance from the nearest nozzle 604 in the nozzle array. The print component can also include a heating element disposed on the print component a second distance from the nearest nozzle in the -nozzle array. The third distance between the temperature sensor and the heating element may be less than the sum of the first and second distance, and where the third distance is greater than or equal to the smaller of the first distance and the second distance. In an example, the nearest nozzle in the nozzle array, the temperature sensor, and the heating element are equidistant from each other. The temperature sensor may be closer to the heating element than it is to the nearest nozzle in the nozzle array.

The nozzle array may be disposed on an external face of the print component that is intended to address a print medium. The temperature sensor may be located closer to three edges of the external face of the print component than to the edge of a nozzle. The heating element may be located in alignment with the nearest nozzle and a second nozzle in the nozzle array. In an example, the first distance is greater than ~100 micrometers. In an example, the third distance can be less than 501 micrometers. An end region may be defined as starting at an edge of a nearest nozzle, where a heating element is located closer to the edge of the nearest nozzle than to a second nearest nozzle. The heating element may be located on the integrated circuitry to raise the temperature on an end region to match a temperature detected from a temperature sensor disposed in a middle region of the integrated circuitry.

In an example, a memory circuit can be associated with a replaceable print head cartridge. The replaceable print head cartridge can include a temperature sensor disposed on the print component a first distance from a nozzle on a silicon die, and a heating element disposed on the silicon die a second distance from the nozzle. As discussed above, the third distance between the temperature sensor and the heating element may be less than the sum of the first and second distance, and where the third distance is greater than or equal to the smaller of the first distance and the second distance. The nozzle, the temperature sensor, and the heating element are roughly equidistant from each other. Roughly equidistant can refer to the first, second, and third distances being the same distance within a deviation measurement. As used herein, a deviation measurement can be equal to the diameter of a nozzle, the height, width, or length of the heating element, the height, width, or length of the temperature sensor. As used herein, the height, width, and length measurements may be taken according to the same orientation conventions established in the discussion section of FIG. 3.

While the present techniques may be susceptible to various modifications and alternative forms, the techniques discussed above have been shown by way of example. It is to be understood that the techniques are not intended to be limited to the particular examples disclosed herein. Indeed, the present techniques include all alternatives, modifications, and equivalents falling within the scope of the following claims.

What is claimed is:

1. A replaceable print head cartridge, comprising:
   an integrated circuitry having a print head die with an array of nozzles to discharge ink;
   a plurality of temperature sensors disposed in a plurality of temperature regions of the integrated circuitry and selectable via one or more selection bits;
   a plurality of heating elements disposed in the plurality of temperature regions of the integrated circuitry, wherein at least one of the plurality of temperature sensors is located between at least one of the array of nozzles and at least one of the plurality of heating elements, wherein a difference between a first distance value, between the at least one of the plurality of temperature sensors and the at least one of the array of nozzles, and a second distance value, between the at least one of the plurality of heating elements and the at least one of the array of nozzles, is within a threshold range of values;
   an analog sense bus conductively connected to all of the temperature sensors;
   a print controller contact; and
   a single external sensor pad conductively connecting the bus to the contact to multiplex responses from the temperature sensors received on the bus.

2. The print head cartridge of claim 1, wherein the integrated circuitry comprises:
   a first print head die and a second print head die each having an array of nozzles to discharge ink; and
   a first temperature sensor of the plurality of temperature sensors is located on the first print head die and a second temperature sensor of the plurality of temperature sensors is located on the second print head die.

3. The print head cartridge of claim 1, wherein the integrated circuitry comprises:
   a first print head die having an array of nozzles to discharge a first color ink;

a second print head die having an array of nozzles to discharge a second color ink; and
a first temperature sensor of the plurality of temperature sensors located on the first print head die and a second temperature sensor of the plurality of temperature sensors is located on the second print head die.

4. The print head cartridge of claim 1, wherein the bus is a single analog bus shared by all of the temperature sensors.

5. The print head cartridge of claim 4, wherein the temperature sensors provide a signal one after the other along the single analog sense bus to the single external sensor pad without repeating until each of the temperatures sensors has provided the signal.

6. The print head cartridge of claim 1, wherein the temperature sensors return a signal to the single external sensor pad in response to an instruction for the cartridge to print.

7. The print head cartridge of claim 1, wherein the single external sensor pad multiplexes signals between the temperature sensors and the contact at a frequency of an integrated circuit print rate divided by a number of the temperature sensors.

8. The print head cartridge of claim 1, wherein:
the print head die includes an end region adjacent to the array of nozzles;
a heating element on the end region; and
at least one of the temperature sensors is located on the end region between the array of nozzles and the heating element in a direction lengthwise along the die.

9. The print head cartridge of claim 1, comprising a control register and wherein each temperature sensor is selected by changing a corresponding bit value in the control register.

10. A replaceable print head cartridge, comprising:
an integrated circuitry having a print head die with an array of nozzles to discharge ink;
a plurality of temperature sensors disposed in a plurality of temperature regions of the integrated circuitry and selectable via one or more selection bits;
a plurality of heating elements disposed in the plurality of temperature regions of the integrated circuitry, wherein at least one of the plurality of temperature sensors is located between at least one of the array of nozzles and at least one of the plurality of heating elements, wherein a difference between a first distance value, between the at least one of the plurality of temperature sensors and the at least one of the array of nozzles, and a second distance value, between the at least one of the plurality of heating elements and the at least one of the array of nozzles, is within a threshold range of values;
a single analog sense bus conductively connected to all of the temperature sensors;
a print controller contact; and
a single external sensor pad conductively connecting the single analog bus to the contact, wherein the temperature sensors provide a signal one after the other along the single analog sense bus to the single external sensor pad without repeating until each of the temperatures sensors has provided the signal.

11. The print head cartridge of claim 10, wherein the single external sensor pad multiplexes responses from the temperature sensors received on the single analog bus.

12. The print head cartridge of claim 11, wherein the temperature sensors return a signal to the single external sensor pad in response to an instruction for the cartridge to print.

13. The print head cartridge of claim 12, wherein the integrated circuitry comprises:
a first print head die and a second print head die each having an array of nozzles to discharge ink; and
a first temperature sensor of the plurality of temperature sensors is located on the first print head die and a second temperature sensor of the plurality of temperature sensors is located on the second print head die.

14. The print head cartridge of claim 12, wherein the integrated circuitry comprises:
a first print head die having an array of nozzles to discharge a first color ink;
a second print head die having an array of nozzles to discharge a second color ink; and
a first temperature sensor of the plurality of temperature sensors is located on the first print head die and a second temperature sensor of the plurality of temperature sensors is located on the second print head die.

15. A replaceable print head cartridge, comprising:
an integrated circuitry having a print head die with an array of nozzles to discharge ink;
a plurality of temperature sensors disposed in a plurality of temperature regions of the integrated circuitry;
a plurality of heating elements disposed in the plurality of temperature regions of the integrated circuitry, wherein at least one of the plurality of temperature sensors is located between at least one of the array of nozzles and at least one of the plurality of heating elements, wherein a difference between a first distance value, between the at least one of the plurality of temperature sensors and the at least one of the array of nozzles, and a second distance value, between the at least one of the plurality of heating elements and the at least one of the array of nozzles, is within a threshold range of values;
a single analog sense bus conductively connected to all of the temperature sensors;
a print controller contact; and
a single external sensor pad conductively connecting the bus to the contact to multiplex responses from the temperature sensors received on the bus and wherein the temperature sensors provide a signal one after the other along the single analog sense bus to the single external sensor pad without repeating until each of the temperatures sensors has provided the signal.

16. The print head cartridge of claim 15, wherein the integrated circuitry comprises:
a first print head die and a second print head die each having an array of nozzles to discharge ink; and
a first temperature sensor of the plurality of temperature sensors is located on the first print head die and a second temperature sensor of the plurality of temperature sensors is located on the second print head die.

17. The print head cartridge of claim 16, wherein the integrated circuitry comprises:
a first print head die having an array of nozzles to discharge a first color ink;
a second print head die having an array of nozzles to discharge a second color ink; and
a first temperature sensor of the plurality of temperature sensors is located on the first print head die and a second temperature sensor of the plurality of temperature sensors is located on the second print head die.

* * * * *